(12) United States Patent
Srinivasan et al.

(10) Patent No.: US 10,223,361 B2
(45) Date of Patent: Mar. 5, 2019

(54) METHODS AND SYSTEMS FOR RESTORING A DATA CONTAINER ARCHIVED AT AN OBJECT-BASED STORAGE

(71) Applicant: NETAPP, INC., Sunnyvale, CA (US)

(72) Inventors: Kiran Nenmeli Srinivasan, Los Gatos, CA (US); Sumeeth Kyathanahalli, Mountain View, CA (US); Sudhindra Tirupati Nagaraj, San Jose, CA (US)

(73) Assignee: NETAPP, INC., Sunnyvale, CA (US)

( * ) Notice: Subject to any disclaimer, the term of this patent is extended or adjusted under 35 U.S.C. 154(b) by 144 days.

(21) Appl. No.: 15/408,736

(22) Filed: Jan. 18, 2017

(65) Prior Publication Data

US 2018/0203865 A1  Jul. 19, 2018

(51) Int. Cl.
*H04L 9/00* (2006.01)
*G06F 17/30* (2006.01)
(Continued)

(52) U.S. Cl.
CPC .... *G06F 17/30073* (2013.01); *G06F 11/1469* (2013.01); *G06F 17/30097* (2013.01);
(Continued)

(58) Field of Classification Search
CPC ......... G06F 17/30073; G06F 17/30097; G06F 17/30501; H04L 63/0428; H04L 9/3247
See application file for complete search history.

(56) References Cited

U.S. PATENT DOCUMENTS

2005/0123167 A1* 6/2005 Maeno .................... G06T 1/005
                                                                    382/100
2008/0229037 A1   9/2008 Bunte et al.
(Continued)

FOREIGN PATENT DOCUMENTS

WO    WO2005043323    5/2005

OTHER PUBLICATIONS

International Search Report on corresponding PCT application (PCT/US2017/062337) from International Searching Authority (EPO) dated Jun. 8, 2018.
(Continued)

*Primary Examiner* — Beemnet W Dada
(74) *Attorney, Agent, or Firm* — Klein, O'Neill & Singh, LLP (57) ABSTRACT

Methods and systems for an object based storage are provided. As an example, a method for generating a metadata object for an archive data container having a plurality of data containers is disclosed. The method includes generating a first metadata signature for the archive data container using an archive data container identifier, a number of data containers within the archive data container, and placement information of each data container within the archive data container; assigning a plurality of blocks for storing data for the plurality of data containers at an object based storage to an intermediate logical object; updating a payload signature with placement information of the plurality of blocks within the intermediate logical object; and placing the first metadata signature and the updated payload signature within the metadata object, wherein the metadata object is used to retrieve location information for a specific data container within the archive data container.

20 Claims, 5 Drawing Sheets

(51) Int. Cl.
*G06F 11/14* (2006.01)
*H04L 9/32* (2006.01)
*H04L 29/06* (2006.01)

(52) U.S. Cl.
CPC ...... *G06F 17/30501* (2013.01); *H04L 9/3247* (2013.01); *H04L 63/0428* (2013.01)

(56) References Cited

U.S. PATENT DOCUMENTS

| | | | | |
|---|---|---|---|---|
| 2010/0074135 A1* | 3/2010 | Pepper | ................... | H04L 43/028 |
| | | | | 370/252 |
| 2010/0275261 A1* | 10/2010 | Kim | ...................... | H04L 63/145 |
| | | | | 726/23 |
| 2010/0332401 A1* | 12/2010 | Prahlad | ............. | G06F 17/30082 |
| | | | | 705/80 |

OTHER PUBLICATIONS

Written Opinion on corresponding PCT application (PCT/US2017/062337) from International Searching Authority (EPO) dated Jun. 8, 2018.

\* cited by examiner

METHODS AND SYSTEMS FOR RESTORING A DATA CONTAINER ARCHIVED AT AN OBJECT-BASED STORAGE

TECHNICAL FIELD

The present disclosure generally relates to network storage systems, and more particularly, to restoring data containers archived at an object-based storage system.

BACKGROUND

Network-based storage is commonly utilized for data backup, geographically distributed data accessibility, and other purposes. In a typical network storage environment, a storage server makes data available to clients by presenting or exporting to the clients one or more logical containers of data. There are various forms of network storage, for example, network attached storage (NAS) and storage area network (SAN). For NAS, a storage server typically services file-level requests from clients, whereas SAN storage servers service block-level requests. Some storage server systems may support both file-level and block-level requests.

There are multiple mechanisms and protocols utilized to access data stored in a network storage system. For example, a Network File System (NFS) protocol or Common Internet File System (CIFS) protocol may be utilized to access a file over a network in a manner similar to how local storage is accessed. The client may also use an object protocol, such as the Hypertext Transfer Protocol (HTTP) protocol or the Cloud Data Management Interface (CDMI) protocol, to access stored data over a LAN or over a wide area network such as the Internet.

Object-based storage (OBS) is a scalable system for storing and managing data objects without using hierarchical naming schemas. OBS systems integrate, or "ingest," variable size data items as objects having unique identifier (ID) keys into a flat name space structure. Objects are accessed and retrieved using key-based searching implemented via a web services interface such as one based on the Representational State Transfer (REST) architecture or simple object access protocol (SOAP). This allows applications to directly access objects across a network using "get" and "put" commands without having to process more complex file system and/or block access commands.

OBS may also be used to store backup/archived files. At any given time, a specific data container from an archived data container may have to be restored. Continuous efforts are being made to develop computing technology that can efficiently restore specific data containers from an OBS based system.

BRIEF DESCRIPTION OF THE DRAWINGS

The various features of the present disclosure will now be described with reference to the drawings of the various aspects. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

The system and techniques described herein are applicable and especially useful in the cloud computing environment where storage is presented and shared across different platforms. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The storage systems described herein can be a part of the server layer for providing storage services.

At a high level, a file system of the present disclosure includes data structures and methods/functions used to organize file system objects, access file system objects, and maintain a hierarchical namespace of the file system. File system objects include directories and files. Since this disclosure relates to object-based storage (OBS) and objects in OBS, a file system object is referred to herein as a "file system entity" instead of a "file system object" to reduce overloading of the term "object." An "object" refers to a data structure that conforms to one or more OBS protocols. Thus, an "inode object" in this disclosure is not the data structure that represents a file in a Unix® type of operating system. The term data container as used herein includes files, directories, or any structured and unstructured data. The term data container and file are used interchangeably throughout this specification.

This description may also use terms like "command," "operation," and "request". Although these terms can be used as variants of a requested action, this description aligns the terms with the protocol and source domain of the requested action. The description uses "file system command" or "command" to refer to a requested action defined by a file system protocol and received from or sent to a file system client. The description uses "object-based operation" or "operation" to refer to a requested action defined by an object-based storage protocol and generated by an object storage backed file system. The description uses "object storage request" to refer to an action defined by a specific object-based storage protocol (e.g., S3) and received from or sent to an object-based storage system.

In one aspect of the present disclosure, methods and systems for an object based storage are provided. As an example, a method for generating a metadata object for an archive data container having a plurality of data containers is disclosed. The method includes generating a first metadata signature for the archive data container using an archive data container identifier, a number of data containers within the archive data container, and placement information of each data container within the archive data container; assigning a plurality of blocks for storing data for the plurality of data containers at an object based storage to an intermediate logical object; updating a payload signature with placement information of the plurality of blocks within the intermediate logical object; and placing the first metadata signature and the updated payload signature within the metadata object, wherein the metadata object is used to retrieve location information for a specific data container within the archive data container.

Overview

In one aspect, the present disclosure provides computing technology to store archived data efficiently and restore the same from an OBS. The computing technology efficiently uses metadata objects to track archived data and uses the metadata objects to restore specific data containers.

Figure 1:
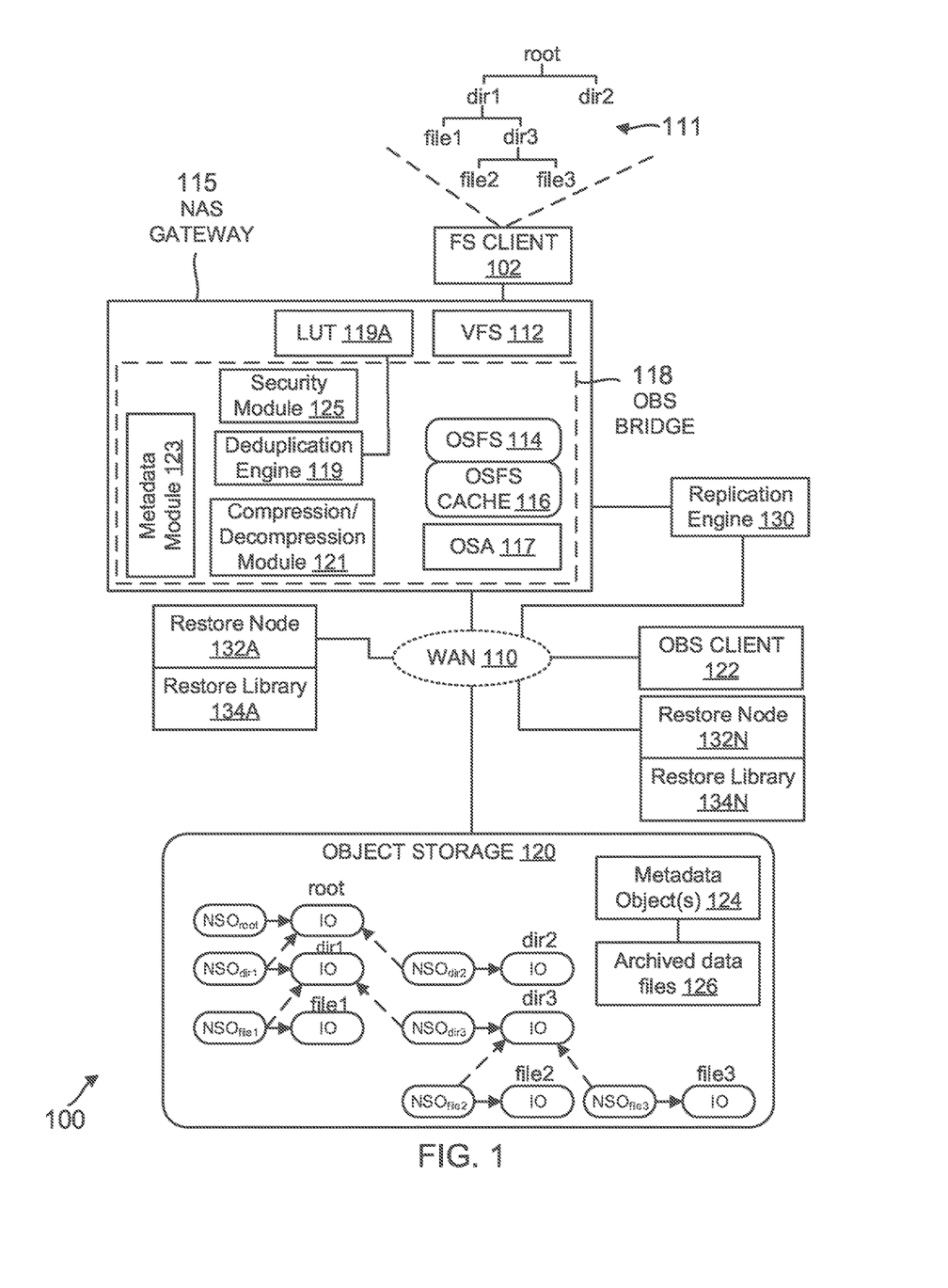
FIG. 1 shows a network storage system that provides object-based storage (OBS)

FIG. 1 depicts a storage environment 100 that provides file system protocol access to an object-based storage (OBS) system, in one aspect of the present disclosure. The storage environment 100 may include an OBS client 122 and a file system client 102 that access an object based storage 120 using various devices, media, and communication protocols. Object based storage 120 may include one or more storage servers (not depicted) that access data from storage hardware devices such as hard disk drives and/or solid state drive (SSD) devices (not depicted). The storage servers service client storage requests across a wide area network (WAN) 110 through web services interfaces such as Representational State Transfer (REST) based interface or (RESTful interface) and simple object access protocol (SOAP).

OBS client 122 may be connected relatively directly to object storage 120 over WAN 110. OBS client 122 may be, for example, a Cloud services client application that uses web services calls to access object-based storage items (i.e., objects). OBS client 122 may, for example, access objects within object storage 120 using direct calls based on a RESTful ["REST"] protocol. It should be noted that reference as a "client" is relative to the focus of the description, as either OBS client 122 and/or file system client 102 may be a "server" if configured in a file sharing arrangement with other servers. Unlike OBS client 122, file system client 102 comprises a file system application, such as a database application that is supported by an underlying Unix® style file system. File system client 102 utilizes file system based networking protocols common in NAS architectures to access file system entities such as files and directories configured in a hierarchical manner. For example, file system client 102 may utilize the network file system (NFS) or Common Internet File System (CIFS) protocol.

In one aspect, storage environment 100 includes a replication engine 130. The replication engine 130 generates an archive file having one or more user files. The archive file is provided to the OBS bridge 118 and stored as archive data files 126 at object storage 120. To efficiently use storage space, the data for the archived data files may be stored using deduplication and compression. Data deduplication reduces the amount of storage space used for storing information. Typically, most storage systems include duplicate copies of many pieces of data. For example, a same data container/block may be saved in several different places or two or more data containers that may not be identical may still include the same data. Deduplication eliminates extra copies by saving just one version of the data and replacing other copies with pointers that lead back to the saved copy.

In one aspect, OBS 118 includes a metadata module 123 that manages a metadata object 124 stored at OBS 120 with archived data 126. A deduplication engine 119 maintains a hash look up table 119A that is used to store the archive file data at object storage 120. A security engine 125 is used to encrypt the archive file data and/or the metadata object 124. A compression/decompression module 121 is used to compress and decompress information stored at object storage 120.

To restore a specific user file, a plurality of restore nodes 132A-132N (referred to as 132) are provided. The restore nodes 132 may execute a restore library 134A-134N that download the metadata object 124 to restore a specific file. It is noteworthy that although the restore nodes are shown separately, the restore library functionality may be incorporated in any other computing device hardware/software. Details of generating the metadata object 124 and restoring a specific file are provided below in detail with respect to FIGS. 2-5.

In one aspect, the storage environment 100 may also include a NAS gateway 115 that provides bridge and NAS server services by which file system client 102 can access and utilize object storage 120. It is noteworthy that the replication engine 130 may be part of the NAS gateway 115. In one aspect, the NAS gateway 115 includes hardware and software processing features such as a virtual file system (VFS) switch 112 and the OBS bridge 118. VFS switch 112 establishes the protocols and persistent namespace coherency by which to receive file system commands from and send responses to file system client 102.

It is noteworthy that OBS 118 may be implemented as a stand-alone computing device/system and the various aspects of the present disclosure are not limited to OBS 118 being a part of gateway 115.

The OBS bridge 118 may also include an object storage backed file system (OSFS) 114 and an associated OSFS cache 116. Together, OSFS 114 and OSFS cache 116 create and manage objects in object storage 120 to accommodate a hierarchical file system namespace 111 ("file system namespace") to a file system client 102. The example file system namespace 111 includes several file and directory entities distributed across three directory levels. The top-level root directory, root, contains child directories dir1 and dir2. Directory dir1 contains child directory dir3 and a file, file1 Directory dir3 contains files file2 and file3.

OSFS 114 processes file system commands in a manner that provides an intermediate OBS protocol interface for file system commands, and that simultaneously generates a file system namespace, such as file system namespace 111, to be utilized in OBS bridge transactions and persistently stored in backend object storage 120. To create the file system namespace, OSFS 114 generates a namespace object and a corresponding inode object for each file system entity (e.g., file or directory). To enable transaction protocol bridging, OSFS 114 generates related groups of object-based operations corresponding to each file system command and applies the dual object per file system entity structure.

File system commands, such as from file system client 102, are received by VFS switch 112 and forwarded to OSFS 114. VFS switch 112 may partially process the file system command and pass the result to the OSFS 114. For instance, VFS switch 112 may access its own directory cache and inode cache to resolve a name of a file system entity to an inode number corresponding to the file system entity indicated in the file system command. This information can be passed along with the file system command to OSFS 114.

OSFS 114 processes the file system command to generate one or more corresponding object-based operations. For example, OSFS 114 may include multiple file system command-specific handlers configured to generate a group of one or more object-based operations that together perform the file system command. In this manner, OSFS 114 transforms the received file system command into an object-centric file system transaction comprising multiple object-based operations. OSFS 114 determines a set of n object-based operations that implement the file system command using objects rather than file system entities. The object-based operations are defined methods or functions that conform to OBS semantics, for example specifying a key value parameter. OSFS 114 instantiates the object-based operations in accordance with the parameters of the file system command and any other information provided by the VFS switch 112. OSFS 114 forms the file system transaction with the object-based operation instances. OSFS 114 submits the transaction to OSFS cache 116 and may record the transaction into a transaction log (not depicted) which can be replayed if another node takes over for the node (e.g., virtual machine or physical machine) hosting OSFS 114.

To create a file system entity, such as in response to receiving a file system command specifying creation of a file or directory, OSFS 114 determines a new inode number for the file system entity. OSFS 114 may convert the inode number from an integer value to an ASCII value, which could be used as a parameter value in an object-based operation used to form the file system transaction. OSFS 114 instantiates a first object storage operation to create a first object with a first object key derived from the determined inode number of the file system entity and with metadata that indicates attributes of the file system entity. OSFS 114 instantiates a second object storage operation to create a second object with a second object key and with metadata that associates the second object key with the first object key. The second object key includes an inode number of a parent directory of the file system entity and also a name of the file system entity.

As shown in FIG. 1, object storage 120 includes the resultant namespace objects (NSOs) and inode objects that correspond to the depicted hierarchical file system namespace 111. The namespace objects and inode objects result from the commands, operations, and requests that flowed through the software stack. As depicted, each file system entity in the file system namespace 111 has a namespace object and an inode object. For example, the top level directory root is represented by a root inode object $IO_{root}$ that is associated with (pointed to) by a namespace object $NSO_{root}$. In accordance with the namespace configuration, the inode object $IO_{root}$ is also associated with each of the child directories' (dir1 and dir2) namespace objects. The multiple associations of namespace objects with the inode objects enables a file system client to traverse a namespace in a hierarchical file system like manner, although the OSFS 114 does not actually need to traverse from root to target. The OSFS arrives at a target only from the parent of the target, thus avoiding traversing from root.

OSFS cache 116 attempts to fulfill file system transactions received from OSFS 114 with locally stored data. If a transaction cannot be fulfilled with locally stored data, OSFS cache 116 forwards the object-based operation instances forming the transaction to an object storage adapter (OSA) 117. OSA 117 responds by generating object storage requests corresponding to the operations and which conform to a particular object storage protocol, such as S3.

In response to the requests, object storage 120 provides responses processed by OSA 117 and which propagate back through OBS bridge 117. More specifically, OSFS cache 116 generates a transaction response which is communicated to OSFS 114. OSFS 114 may update the transaction log to remove the transaction corresponding to the transaction response. OSFS 114 also generates a file system command response based on the transaction response, and passes the response back to file system client 102 via VFS switch 112.

In addition to providing file system namespace accessibility in a manner enabling native as well as bridge-enabled access, the described aspects provide namespace portability and concurrency for geo-distributed clients. Along with file data and its associated metadata, object store 120 stores a persistent representation of the namespace via storage of the inode and namespace objects depicted in FIG. 1. This feature enables other, similarly configured OBS bridges to attach/mount to the same backend object store and follow the same schema to access the namespace objects and thus share the same file system with their respective file system clients. The OBS bridge configuration may thus be applied in multi-node (including multi-site) applications in order to simultaneously provide common file system namespaces to multiple clients across multiple sites. Aspects of the disclosure may therefore include grouping multiple OBS bridges in a cluster configuration to establish multiple corresponding NAS gateways.

Figure 2:
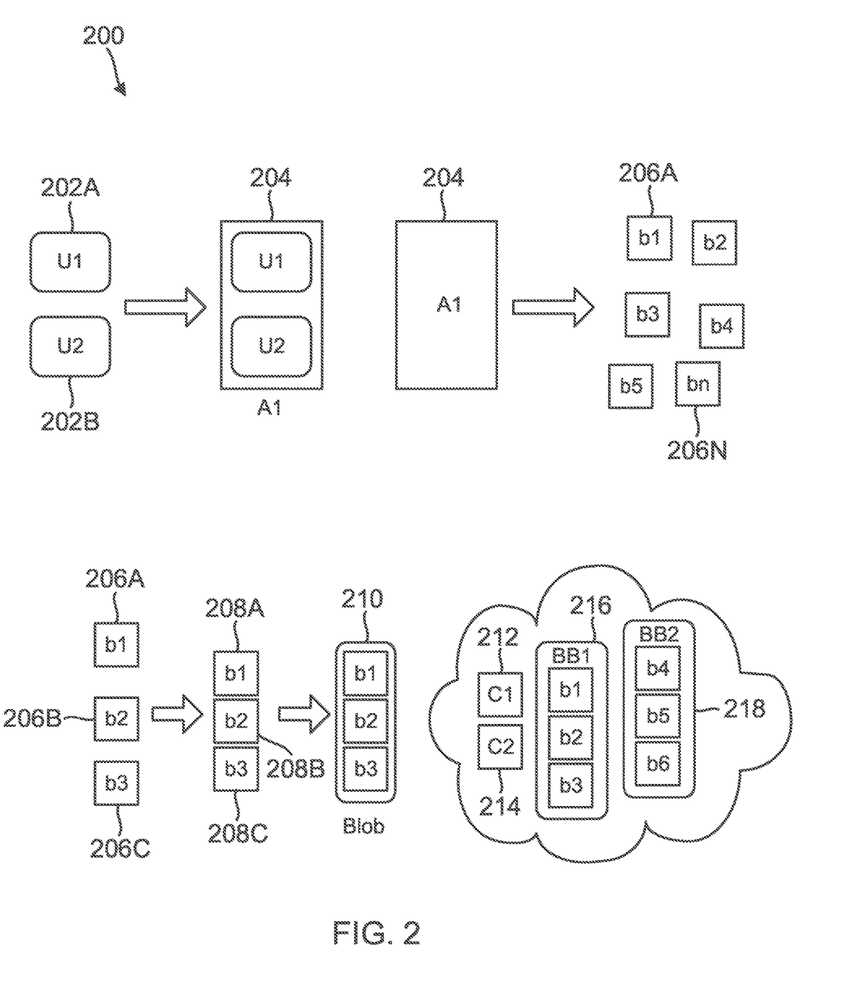
FIG. 2 shows an example of various stages of creating a metadata object that is used for restoring a data container from an OBS, according to one aspect of the present disclosure.

Metadata Object 124: FIG. 2 illustrates the novel computing technology 200 for efficiently generating and storing the metadata object 124 that may be used for a single data container restore from a backup archive data container (or backup archive file). The backup archive data container is an aggregation of user data which may include user-defined files (may be referred to as user-files) but written as a single file. As an example, the backup archive data container stores data in object based storage 120 using encryption, compression and deduplication.

The innovative computing technology disclosed herein inspects a backup archive file and understands the offset and size of each user-file within the backup archive file. This information is then stored as part of the metadata object 124 in the object storage 120 along with the backup data for every backup archive file. The metadata object 124 is stored in the object storage 120 using efficient compression techniques such that the storage and lookup of the metadata is not resource intensive.

At the restore nodes 132, the metadata object 124 is read by a restore library module 134 to allow targeted restore of any file after decrypting, uncompressing and assembling data into an original format of the stored data archived data. The restore process of the disclosed technology uses minimal network bandwidth and provides better performance since multiple nodes can share the load for the restore process.

Referring now to FIG. 2, as an example, two user files U1 202A and U2 202B are aggregated in an archive file identified as A1 and labelled as 204 by the replication engine 130. When the archive file is received by the OBS 118, the deduplication engine 119 obtains the placement information of U1 and U2 within A1. For example, assume that the length of U1 is L1 and the length of U2 is L2. If O1 is the offset of U1 within A1 and O2 is the offset for U2 within A1, then the metadata of the user files may be represented by: [<O1, L1>,<O2, L2>]. An initial metadata signature of the backup archive file A1 is then determined. The initial metadata signature is a map, where a key is the name of the user file, and the value is the placement information of the user file within A1. Thus initial metadata signature for A1 may be represented by:

U1=><O1, L1>
U2 =><O2, L2>

The foregoing initial signature is converted to a normalized sequence based on: <number of user files>,<name of user file1 >,<placement info of user file1>,<name of user file2>,<placement info of user file2>, . . . , <name of user filen>,<placement info of user filen>. Using the foregoing normalized sequence and continuing with the example of FIG. 2, the metadata signature for A1 may be represented as: [2, U1, O1, L1, U2, O2, L2] by the metadata module 123.

The data within the archive file A1is then split into different blocks, shown as b1 206A and bn 206N. Before any block is stored, the deduplication engine 119 checks the data blocks against the lookup table 119A that stores a key-value map. The key to the lookup table 119A is a signature of the data block that may be based on a checksum of the data block and a block identifier. As an example, the lookup table 119A generated and maintained by the deduplication engine 119 may be represented as:

Hash(B1)⇒B1
Hash(B2)⇒B2
Hash(B3)⇒B3

If the lookup table yields a match, then the block ID reference count is updated. This ensures that the block is only stored once at a physical storage device but referenced by more than one logical entity.

If there is no match, then a new entry is created at lookup table 119A. Assume that initially blocks b1, b2 yield a hit in the lookup table while the rest of the blocks {b3 . . bn} do not. The blocks that did not yield are created as new blocks like B4, B5, . . . , Bn and the updated lookup table is represented as:

Hash(B1) => B1
Hash(B2) => B2
Hash(B3) => B3
Hash(B4) => B4
Hash(B5) => B5
|
|
Hash(Bn) => Bn Based on the foregoing, the payload signature of A1 may be represented by: B1, B2, B3 B4, B5, . . . , Bn. The updated signature of the backup archive file A1 may be represented by the backup ID, the metadata signature and the data signature. For example, using the example of FIG. 2, the updated signature may be represented by: A1, 2, U1, O1, L1, U1, O1, L2, B1 , B2, B3, B4, B5, . . . , Bn.

To further improve storage efficiency, the various data blocks are further aggregated into chunks also referred to as "blobs". For example, blocks b1, b2and b3 are compressed by compression engine 121 and encrypted by security engine 125, for example, by using a symmetric encryption key K. The compressed and encrypted blocks 208A-208C are then placed within or assigned to blob 210. A blob is a logical object that is uniquely identified and includes one or more blocks of compressed/encrypted data. The placement of each compressed/encrypted block within a blob is used to update the payload signature from B1, B2-Bn to: BB1, PB1, SZB1, PB2, SZB2, BB2, PB3, SZB3, PB4, SZB4, . . . BBk, PBn, SZBn, where BB1=Blob Id for blob #1, PB1=Placement information within the block that includes an offset and length of block B1 within BB1, SZB1 = Canonical unprocessed (meaning, uncompressed and unencrypted) size of block B1, and so forth.

The updated metadata signature of the archive file may now be represented by: A1, 2, U1, O1, L1, U2, O2, L2, BB1, PB1, SZB1, PB2 , SZB2, BB2, PB2, SZB3, PB4, SZB4, . . . BBk, PBn, SZ Bn.

The foregoing metadata sequence is then compressed by compression engine 121 using compression algorithms to get further space savings, and encrypted using the same encryption key K mentioned above. The compressed and encrypted metadata is then stored within the metadata object 124, which is stored at the object storage 120. The name of the object, for example, C1 (shown as 212) is obtained by taking a checksum of the contents of the object.

FIG. 2 as an example, shows two metadata objects C1 212 and C2 214. C1 includes the compressed/encrypted metadata for one archive file and C2 includes a signature for another archive file. The data blocks are also compressed and stored within blobs 216 and 218.

Figure 3:
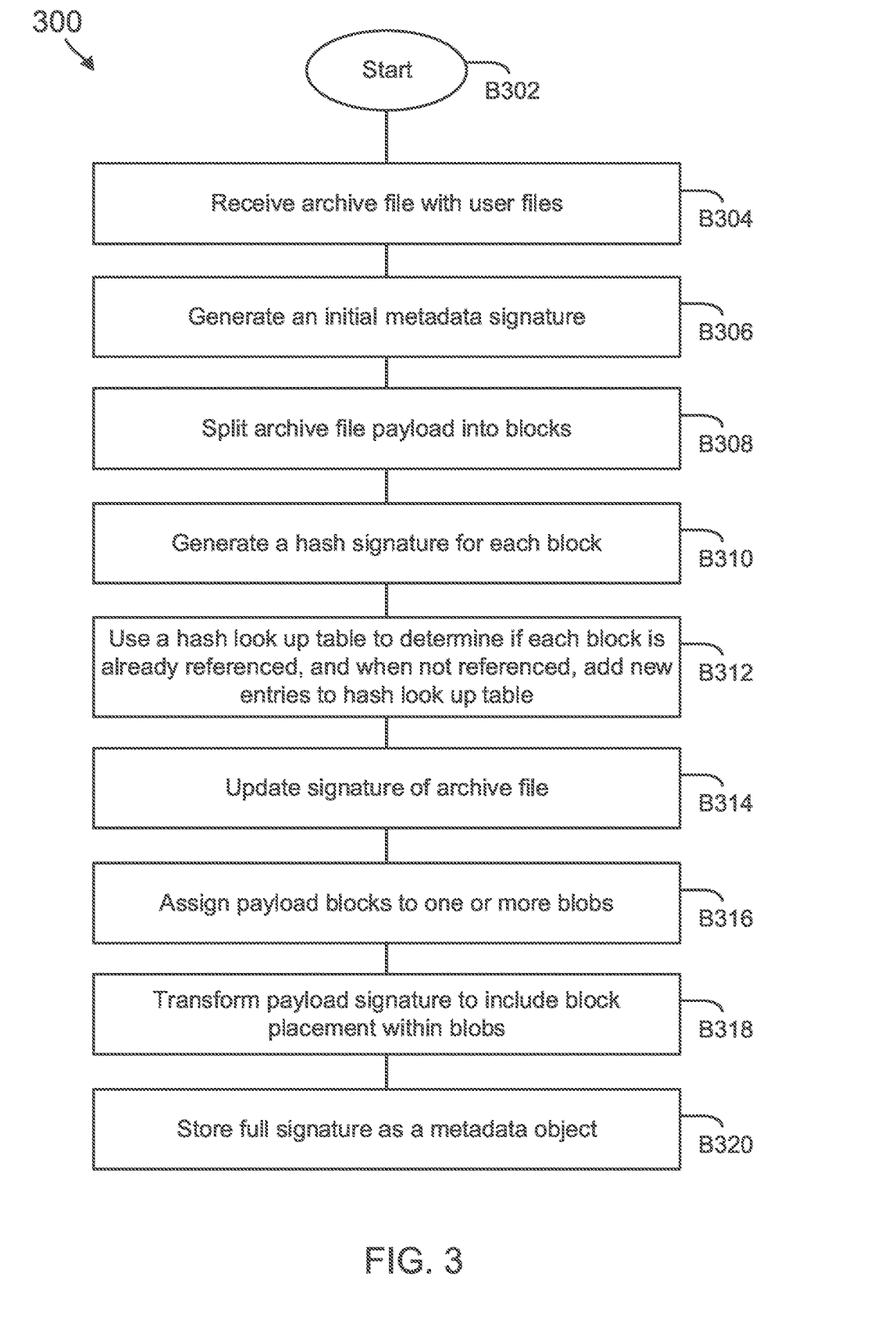
FIG. 3 shows a process flow for creating the metadata object, according to one aspect of the present disclosure.

Process Flow: FIG. 3 shows a processor, executable process flow 300 to generate the metadata object 124, according to one aspect of the present disclosure. Process 300 is described below with respect to the notations/reference numbers of FIG. 2.

Process 300 begins in block B302, when OBS 118 and the replication engine 130 are initialized and operational. In block B304, the OBS 118 receives an archive file with a plurality of user files, for example, A1 with files U1 and U2 , as shown in FIG. 2 and described above.

In block B306, an initial metadata signature for the archive file is generates by the metadata module 123. The initial metadata signature is based on the number of files within the archive file, file identifier, placement information of the user file within the archive file. As shown above with respect to A1, U1 and U2, the initial metadata signature may be represented as [2, U1, O1, L1, U2, O2, L2].

In block B308, the deduplication engine 119 splits the payload in the user files into multiple blocks, for example, b1, b2, b3 . . . bn [See FIG. 2]. The block size may be fixed or variable.

In block B310, a hash signature (for example, B1, B2 . . . Bn [FIG. 2]) for each block is generated by the deduplication engine 119. The hash signature may be based on the checksum of each block's data content.

In block B312, the deduplication engine 199 verifies the hash signature of each data block with the hash look up table 119A that stores a key value map, where the key is a signature of each block associated with a block identifier. If a block identifier for a block is already in the look up table 119A, then a reference count for that block is updated. If the block identifier is not in the look-up table 119A, then the lookup table 119A is updated with the new block signature and block identifier.

In block B314, the payload signature is first updated with the hash signatures, namely, B1-Bn. The signature of the archive file A1 is then updated to include the backup ID, the metadata signature and the updated payload signature, for example, A1, 2, U1, O1, L1, U2, O2, L2, B1, B2, B3, B4, B5, . . . , Bn. Storing data blocks "as-is" can be resource intensive. Hence, in block B316, the blocks are compressed and encrypted by the compression engine 121 and encrypted by the security engine 125. In one aspect, the encryption is executed using a symmetric key, K. The compressed and encrypted blocks are then assigned to another logical structure, mentioned and described above as blobs (shown as 210, 216 and 218 in FIG. 2). The payload signature is then transformed/updated in block B318 to include the placement information of the compressed/encrypted blocks within each blob. The full signature for the archive file is then updated and may be represented as: A1, 2, U1, O1, L1, U2, O2, L2, BB1, PB1, SZB1, PB2, SZB2, BB2, PB3, SZB3, PB4, SZB4, . . . BBk, PBn, SZ Bn.

In block B320, the full signature is compressed/encrypted with the same encryption key, K. The compressed/encrypted signature is stored within an object, for example, C1 212, C2 214 [FIG. 2]. Objects C1/C2 are stored as the metadata object 124 that can be used to restore a specific file, as described below with respect to FIG. 4.

Figure 4:
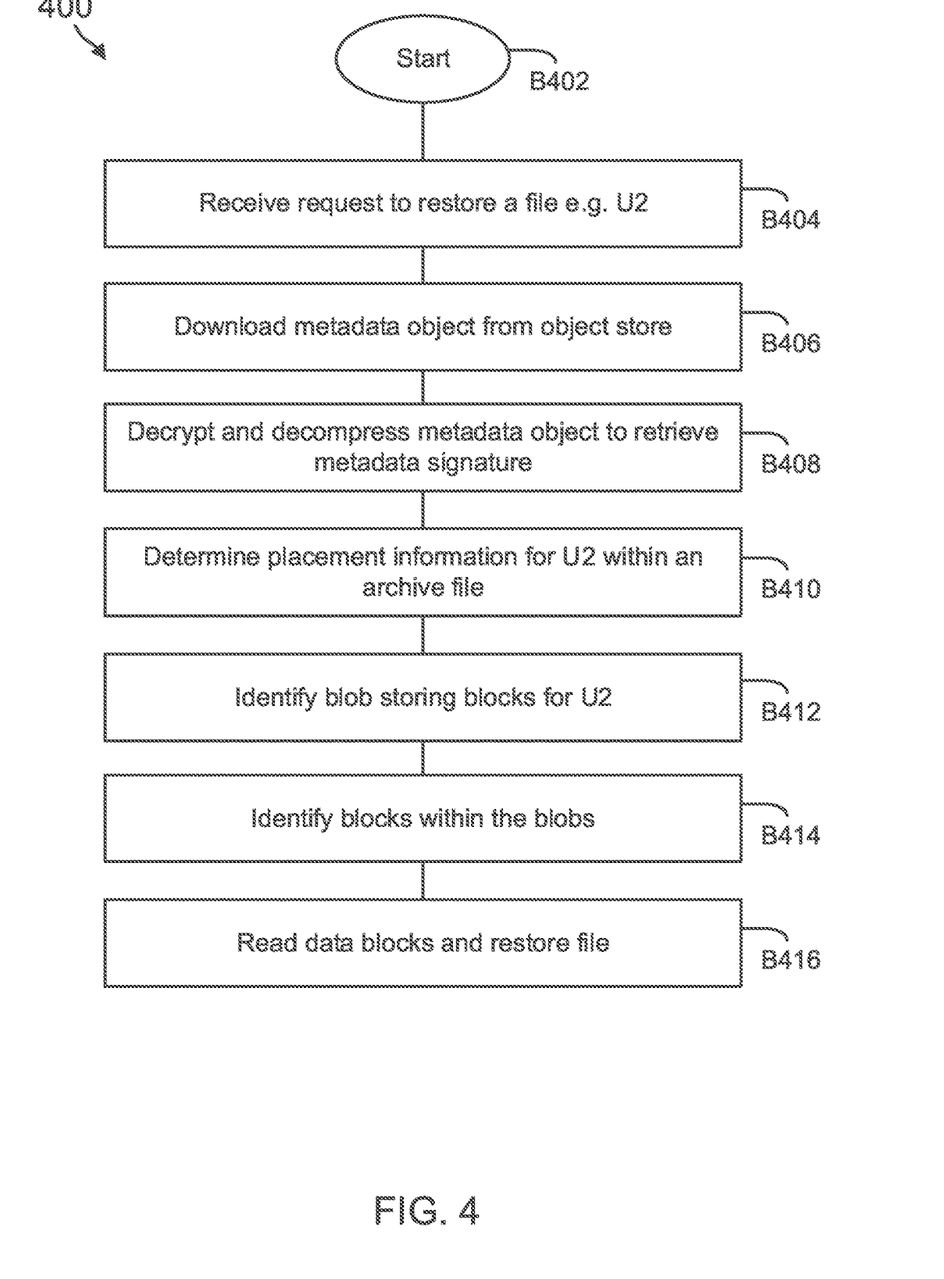
FIG. 4 is a process flow for restoring a specific data container from an object based storage, according to one aspect of the present disclosure.

FIG. 4 shows process 400 for restoring a user file that is archived and stored at the object store 120, according to one aspect of the present disclosure. Process 400 begins in block B402, after the metadata object 124 has been created for the archived file 126, as described above with respect to FIGS. 2 and 3.

In block B404, a request to restore a certain file is received. The request may be received by a restore node 132 executing restore library 134 [See FIG. 1].

In response to the request, in block B406, the restore library 134 downloads the metadata object 124 that includes the full signature of the archive file (for example, C1 212) that includes the user file, for example, U2.

In block B408, the metadata object is decompressed and decrypted by the restore library 134 using the key that was used to encrypt the metadata object, as described above.

In block B410, the placement of the user file U2 in the archive file A1 is determined, for example, [O2, L2] as described above with respect to FIG. 2. The blobs associated with the file U2 are then identified. The blocks within the identified blobs are determined in block B414. The blocks are then read by OBS 118 from the object store 120 and provided to the restore library 134 in block B416. The requested blocks are then provided to the requestor.

The technology disclosed herein improves computing technology and cloud based storage systems. Data is replicated at object storage efficiently and restored using a metadata object, described above in detail.

Figure 5:
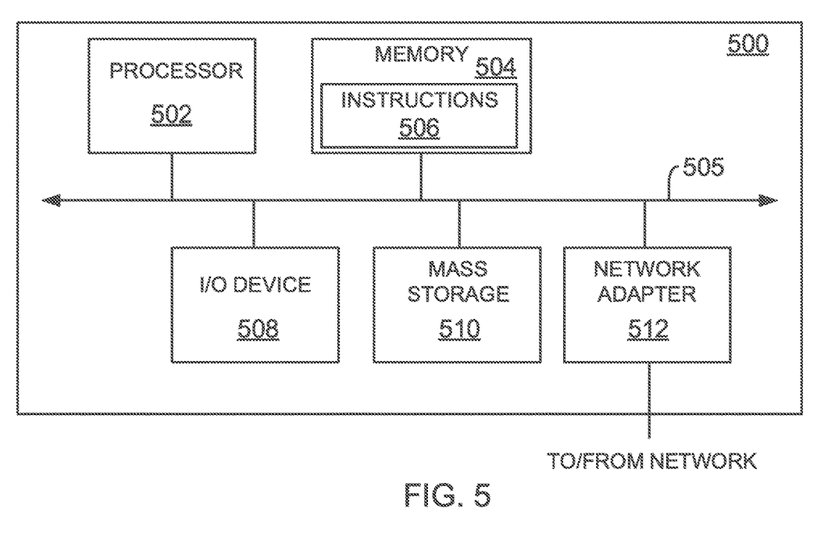
FIG. 5 shows a block diagram of a computing system for executing the various process blocks of the present disclosure.

Processing System: FIG. 5 is a high-level block diagram showing an example of the architecture of a processing system 500 that may be used according to one aspect. The processing system 500 can represent a restore node 132, OBS 118, replication engine 130, NAS gateway 115, FS client 102, OBS client 122 and other components. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 implement the process steps of FIGS. 2-4 described above may reside in and executed by processors 502 from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality provided as individual modules/units in the example illustrations can be organized differently in accordance with any one of platform (operating system and/or hardware), application ecosystem, interfaces, programmer preferences, programming language, administrator preferences, etc.

Any combination of one or more non-transitory machine readable medium(s) may be utilized. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory machine readable storage medium may be any tangible medium that can contain, or store a program for use by or in connection with an instruction execution system, apparatus, or device. A non-transitory machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a non-transitory machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for restoring a data container from an object storage described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality shown as separate components in the example configurations may be implemented as a combined structure or component. Similarly, structures and functionality shown as a single component may be implemented as separate components. These and other variations, modifications, additions, and improvements may fall within the scope of the disclosure.

What is claimed is:

1. A method, comprising:
   generating by a processor, a first metadata signature for an archive data container having a plurality of data containers, using an archive data container identifier, a number of data containers within the archive data container, and placement information of each data container within the archive data container;
   assigning by the processor, a plurality of blocks to an intermediate logical object for storing data for the plurality of data containers at an object based storage;
   updating by the processor, a payload signature with placement information of the plurality of blocks within the intermediate logical object;
   using a metadata object by the processor, for storing the first metadata signature and the updated payload signature; and
   retrieving by the processor, from the metadata object, placement information of a data container within the archive data container, in response to a restore request for the data container.

2. The method of claim 1, further comprising:
   identifying by processor, from the metadata object, an intermediate logical object associated with the data container.

3. The method of claim 1, further comprising:
   obtaining by the processor, identifier for a block of an intermediate logical object associated with the data container, storing data for the data container.

4. The method of claim 1, further comprising:
   retrieving by the processor, data for the data container from the object based storage based on an identified block of an intermediate logical block associated with the data container.

5. The method of claim 1, wherein a library module of a restore node downloads the metadata object from the object based storage to determine the placement information for the data container.

6. The method of claim 1, wherein the first metadata signature and the updated payload signature are compressed before being placed in the metadata object.

7. The method of claim 1, wherein the first metadata signature, the updated payload signature and data for the data containers are encrypted using an asymmetric encryption key.

8. A non-transitory machine readable storage medium having stored thereon instructions for performing a method, comprising machine executable code which when executed by at least one machine, causes the machine to:
generate a first metadata signature for an archive data container having a plurality of data containers, using an archive data container identifier, a number of data containers within the archive data container, and placement information of each data container within the archive data container;
assign a plurality of blocks to an intermediate logical object for storing data for the plurality of data containers at an object based storage;
update a payload signature with placement information of the plurality of blocks within the intermediate logical object;
use a metadata object for storing the first metadata signature and the updated payload signature; and
retrieve from the metadata object, placement information of a data container within the archive data container, in response to a restore request for the data container.

9. The non-transitory storage medium of claim 8, wherein the machine executable code which when executed by at least one machine further causes the machine to:
identify from the metadata object, an intermediate logical object associated with the data container.

10. The non-transitory storage medium of claim 8, wherein the machine executable code which when executed by at least one machine, further causes the machine to:
obtain identifier for a block of an intermediate logical object associated with the data container, storing data for the data container.

11. The non-transitory storage medium of claim 8, wherein the machine executable code which when executed by at least one machine, further causes the machine to:
retrieve data for the data container from the object based storage based on an identified block of an intermediate logical block associated with the data container.

12. The non-transitory storage medium of claim 8, wherein a library module of a restore node downloads the metadata object from the object based storage to determine the placement information for the data container.

13. The non-transitory storage medium of claim 8, wherein the first metadata signature and the updated payload signature are compressed before being placed in the metadata object.

14. The non-transitory storage medium of claim 8, wherein the first metadata signature, the updated payload signature and data for the data containers are encrypted using an asymmetric encryption key.

15. A system comprising:
a memory containing machine readable medium comprising machine executable code having stored thereon instructions; and a processor coupled to the memory, the processor configured to execute the machine executable code to:
generate a first metadata signature for an archive data container having a plurality of data containers, using an archive data container identifier, a number of data containers within the archive data container, and placement information of each data container within the archive data container;
assign a plurality of blocks to an intermediate logical object for storing data for the plurality of data containers at an object based storage;
update a payload signature with placement information of the plurality of blocks within the intermediate logical object;
use a metadata object for storing the first metadata signature and the updated payload signature; and
retrieve from the metadata object, placement information of a data container within the archive data container, in response to a restore request for the data container.

16. The system of claim 15, wherein the machine executable code is further executed to:
identify from the metadata object, an intermediate logical object associated with the data container.

17. The system of claim 15, wherein the machine executable code is further executed to:
obtain identifier for a block of an intermediate logical object associated with the data container, storing data for the data container.

18. The non-transitory storage medium of claim 15, wherein the machine executable code is further executed to:
retrieve data for the data container from the object based storage based on an identified block of an intermediate logical block associated with the data container.

19. The system of claim 15, wherein a library module of a restore node downloads the metadata object from the object based storage to determine the placement information for the data container.

20. The system of claim 15, wherein the first metadata signature and the updated payload signature are compressed before being placed in the metadata object.

* * * * *